United States Patent [19]

Frazier

[11] Patent Number: 5,080,431
[45] Date of Patent: Jan. 14, 1992

[54] MOTORCYCLE SEAT PROTECTOR

[76] Inventor: Dan F. Frazier, 76944 Oklahoma St., Palm Desert, Calif. 92260

[21] Appl. No.: 480,640

[22] Filed: Feb. 15, 1990

[51] Int. Cl.⁵ ............................................. A47C 31/00
[52] U.S. Cl. .................................. 297/184; 297/219; 297/224
[58] Field of Search ................ 297/184, 195, 219, 224

[56] References Cited

U.S. PATENT DOCUMENTS

| | | | |
|---|---|---|---|
| 2,238,795 | 4/1941 | Katzner | 297/224 |
| 3,537,746 | 11/1970 | Peters . | |
| 4,118,066 | 10/1978 | Ricke | 297/184 |
| 4,171,145 | 10/1979 | Pearson, Sr. . | |
| 4,320,922 | 3/1982 | Meritis | 297/184 X |
| 4,536,028 | 8/1985 | Jones et al. | 297/224 |
| 4,600,238 | 7/1986 | Goodford | 297/219 |
| 4,790,592 | 12/1988 | Busso et al. . | |

FOREIGN PATENT DOCUMENTS

| | | | |
|---|---|---|---|
| 533635 | 11/1956 | Canada | 297/219 |
| 783 | of 1912 | United Kingdom | 297/219 |
| 389958 | 3/1933 | United Kingdom . | |

Primary Examiner—Peter R. Brown
Attorney, Agent, or Firm—Fay, Sharpe, Beall, Fagan, Minnich & McKee

[57] ABSTRACT

A device for protecting a motorcycle seat which includes a retractable cover which can be extended to shield the surface of the seat from exposure, thereby preventing deterioration of the seat. The cover is retracted into a housing which can fit snugly underneath the bottom of the seat or can alternatively be mounted to the frame of the motorcycle directly adjacent the lower edge of the seat. When in extended position, the cover can be secured by means of a hook and loop type fastener or by means of a post and hole fastening mechanism. The cover is made of a material which is both waterproof and heat resistant. The housing provides a spring biased wind-up mechanism for easy retraction of the cover and to provide tension to the cover when in extended position thereby aiding in keeping the cover snugly fitted to the seat.

3 Claims, 3 Drawing Sheets

MOTORCYCLE SEAT PROTECTOR

BACKGROUND OF THE INVENTION

The present invention relates to seat protectors, more specifically, the present invention relates to protective motorcycle seat covers.

Motorcycle seats are commonly exposed to the elements when a motorcycle is parked in an unprotected location. The seat is subjected to significant deterioration as a result of this exposure, and further, the rider can be subjected to significant discomfort or inconvenience as the seat is heated by sun exposure or moistened by precipitation.

Protection has been available by providing a tent-like enclosure which covers the entire motorcycle or by providing a motorcycle seat cover which extends from the front of the seat to the back of the seat covering the entire seating area. Full cycle covers present a storage and transporation difficulty and are often inconvenient and time consuming to deploy and/or to remove. Full seat covers can also be inconvenient to store during operation of the motorcycle.

Further, covers which slide over the seat and are secured with elastic can easily be stolen from the cycle, presenting an expense and an inconvenience to the biker and re-exposing the original seat. Covers which remain more permanently attached to the seat, while protecting the original seat from deterioration, do not provide water protection for the rider or prevent heating of the seat. These covers, which remain exposed for extended periods of time can also suffer the effects of weathering thus rendering them ineffective.

SUMMARY OF THE INVENTION

It is an object of the present invention to provide a motocycle seat protector which includes a cover which is durable, protects the seat from deterioration from the elements and is easily and conveniently stored on a motorcycle.

It is another object of the present invention to provide a motorcycle seat protector which is sufficiently secured to the motorcycle to inhibit theft but is readily deployed and readily retracted.

It is yet another object of the present invention to provide a seat protector which includes a cover for shielding the seat and a housing for storage of the cover when the seat does not need protection.

It is still another object of the present invention to provide a seat protector which can be installed as an after-market add-on by the user of the motorcycle.

It is a further object of the present invention to provide a seat protector having a simplified mounting configuration enabling ease of attachment as a factory-installed option or as an after-market add-on.

It is still another object of the present invention to provide a seat protector which, when stored, does not interfere with the operation of the motorcycle.

To satisfy the above and other objects, the present invention includes a cover of a durable, waterproof and heat reflective material, retractable into a cylindrical housing which can be mounted to the motorcycle frame or to the underside of the motorcycle seat. The cover can be extended to shield the surface of the seat from exposure, thereby preventing deterioration of the seat. The housing can fit snugly underneath the bottom of the seat or can alternatively be mounted to the frame of the motorcycle directly adjacent the lower edge of the seat. When in extended position, the cover can be secured by means of a hook and loop type fastener or by means of a post and hole fastening mechanism. The housing provides a spring biased wind-up mechanism for easy retraction of the cover and to provide tension to the cover when in extended position, thereby aiding in keeping the cover snugly fitted to the seat. Mounting the housing to the frame or seat of the motorcycle deters theft and eases storage and transportation of the cover.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF THE PRESENT INVENTION

Two embodiments of the present invention, one primarily an after-market add-on for motorcycles and a second, primarily a factory-installed embodiment, are described below. Both of the embodiments provide a retractable cover for protecting the seat of the motorcycle. The first embodiment, FIGS. 1-4, is designed for easy installation on a motorcycle after final assembly. The second embodiment, FIGS. 5-8, allows for installment prior to assembly and provides for a lighter weight assembly which is hidden beneath the seat when retracted.

Figure 1:
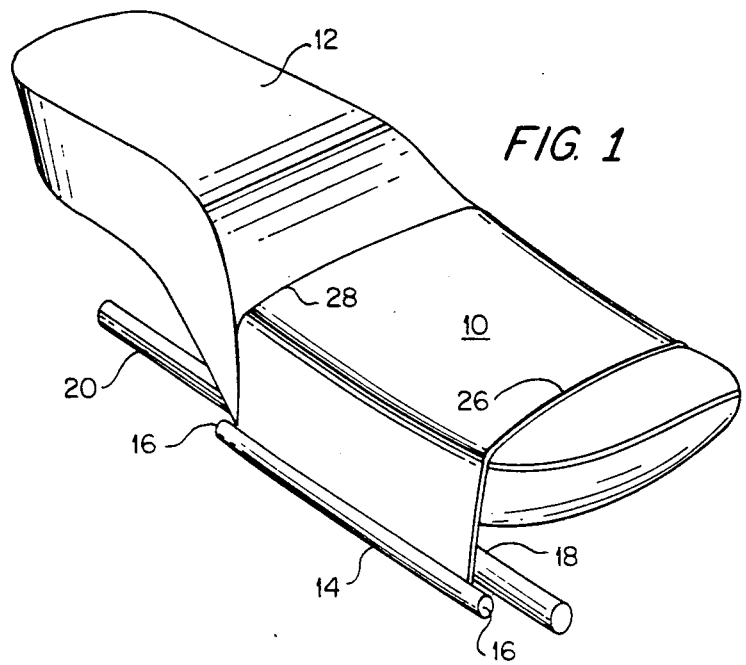
FIG. 1 is a perspective view of a first embodiment of the present invention protecting a portion of a motorcycle seat.

As illustrated in FIG. 1, a motorcycle seat protector, built in accordance with a first embodiment of the present invention, includes a cover portion 10 made of a flexible, waterproof and heat reflective material, and a cylindrical housing 14 for storing the cover 10. The cover 10 is pulled from the housing and stretched over the bike seat 12 (FIG. 4) when in use. The housing 14 includes end cap members 16 which can be provided with a spring-actuated, winding mechanism for retracting the cover 10 into the housing 14 and for keeping the cover 10 taut when in extended position.

Figure 3A:
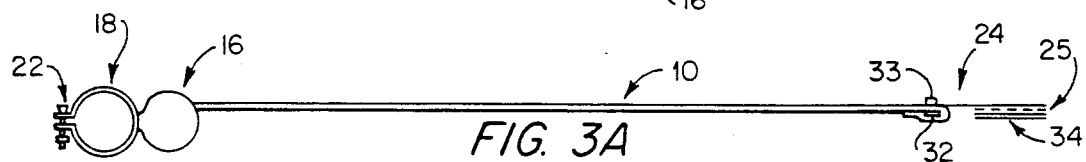
FIG. 3A is a side view of the seat cover of FIG. 2 in extended position.
Figure 2:
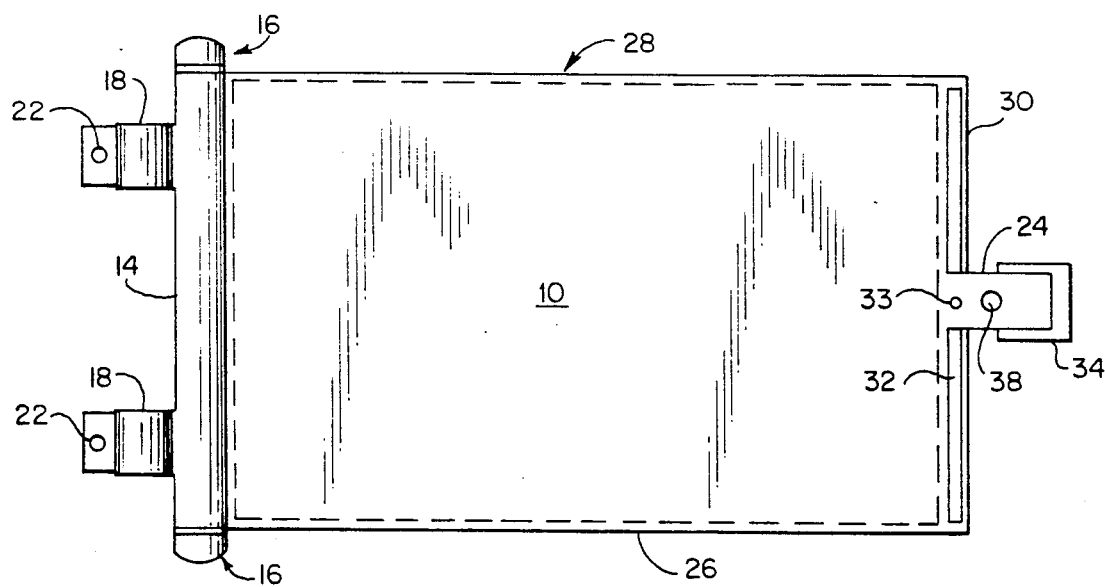
FIG. 2 is a top planer view of the first embodiment of the present invention illustrated in extended position.

As better illustrated in FIGS. 2 and 3, the housing 14 of the first embodiment of the seat protector of the present invention is provided with clips 18 for attaching the housing 14 to the bike frame 20. The clips 18 are shaped to fit over the tubular members of the bike frame 20, and include a screw 22 for securing the clips 18 in place.

The cover 10 is essentially rectangular, having a forward edge 26 and and a rear edge 28 which extend laterally across the seat 12, as illustrated in FIG. 1. Edges 26 and 28 are elasticized to cause the edges to be pressed tightly against the seat 12 to prevent the seepage of moisture under the cover 10. The free end 30 of the cover 10 includes a reinforcing bar 32 and a tab member 24. The tab 24 can be of a vinyl or plastic material to provide it with sufficient strength. Alternatively, the tab 24 can be of a heavy, durable cloth. The bar 32 can be made of metal or other suitably ridged material to provide sufficient strength to hold the free end 30 relatively linear. A rivet 33 can be utilized to secure the bar 32 and the tab 24 to the cover 10 to further reinforce the stitching of the bar 32 within and the tab 24 to the cover 10.

Figure 3B:
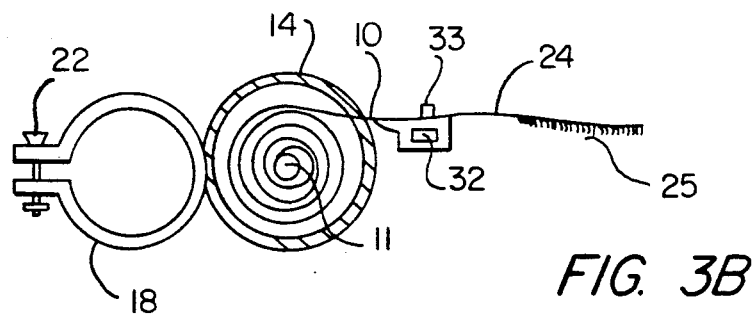
FIG. 3B is a cross-sectional side view of the seat cover of FIG. 2 in retracted position.

As illustrated in FIG. 3B, the cover 10 retracts into the housing 14 to form a spiral about central axis 11. As stated above, spring winding mechanisms are provided in end caps 16 to provide the necessary rotation of axis 11 to retract cover 10 into housing 14.

Figure 4:
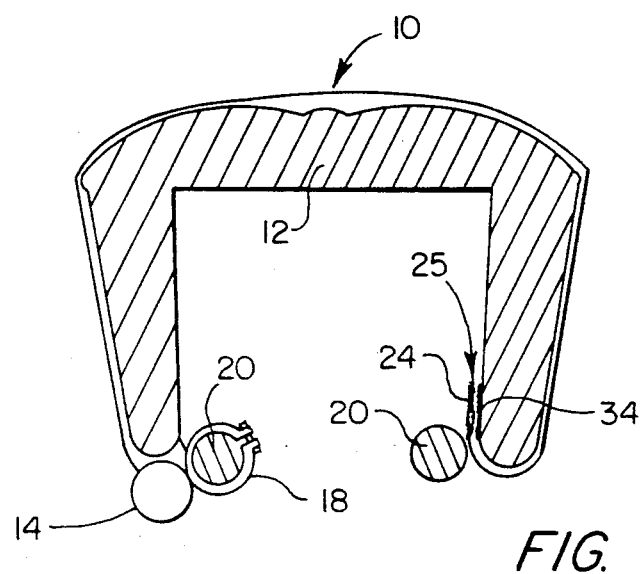
FIG. 4 is a partial cross-section end view of the first embodiment of the cover of the present invention in place over a motorcycle seat.
Figure 8:
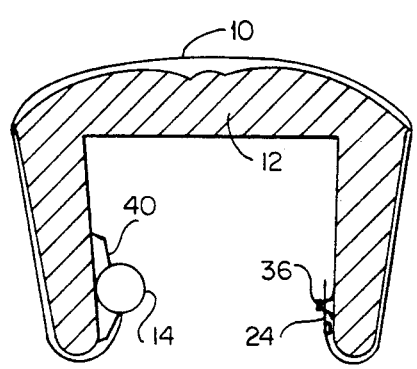
FIG. 8 is a partial cross-section end view of the second embodiment of the cover of the present invention in place over a motorcycle seat.

When the cover 10 is extended across a seat 12, as illustrated in FIGS. 4 and 8, the tab 24 is utilized to retain the cover 10 in extended position. In the first embodiment, FIG. 4, the tab 24 is provided with an area 25 of a hook-and-loop type securing means such as VELCRO, and the underside of the seat is provided with a corresponding patch 34 of VELCRO. The cover 10 is extended from the housing 14 and stretched over the seat 12. The area 25 of tab 24 is then pressed against the patch 34, retaining the cover 10 in position. The bar 32 ensures that the free end 30 remains linear so that the cover 10 will extend evenly over the seat 12. The patch 34 can be provided with an adhesive backing to secure it to the seat 12. The adhesive backing makes the patch 34 easily installable by the after-market user.

Figure 6A:
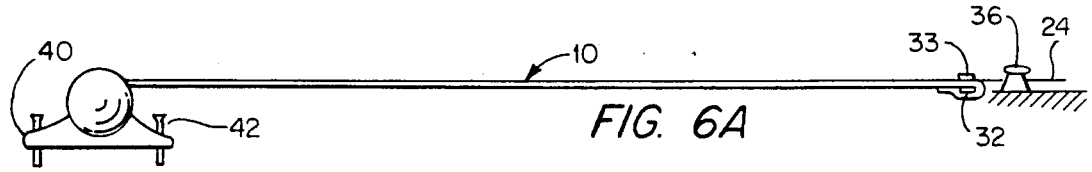
FIG. 6A is a side view of the seat cover of FIG. 7.
Figure 6B:
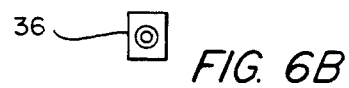
FIG. 6B is a top view of the securing post illustrated in FIG. 6A.
Figure 7:
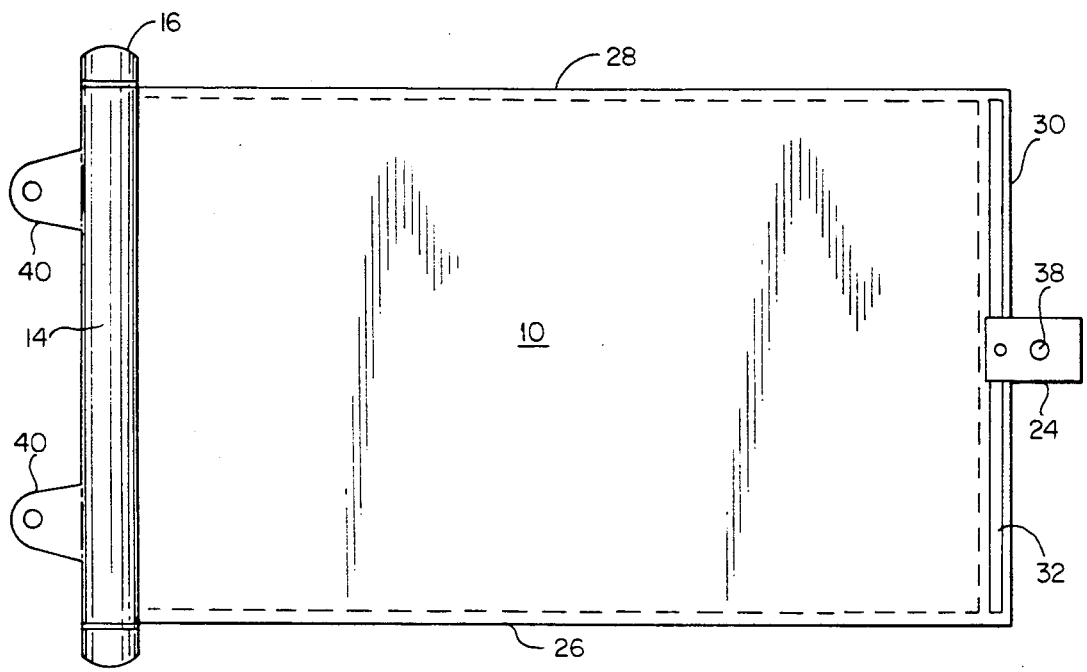
FIG. 7 is a top planer view of the second embodiment of the present invention illustrated in extended position.

Alternatively, a securing post 36, such as that illustrated in FIG. 6B, can be utilized to secure the tab 24 to the underside of the seat 12. A hole 38, as illustrated in FIGS. 2 and 7 is provided for engagement with the post 36. As illustrated in FIGS. 6 and 8, post 36 passes through hole 38 in the manner of a button and buttonhole. The post can be utilized alone or in conjunction with the interlocking hook-and-loop sections. Further, the post 36 or the patch 34 can be attached to the seat 12 or to the frame 20, in order to effectively retain the cover 10 extended over the seat 12.

When adding the protective device to a motorcycle as an after-market product, the patch 34 is installed underneath the seat 12 by the consumer by adhering it to an inner surface of the seat 12. The user also attaches the housing to the frame 20 utilizing the clamps 18. The user can then extend the cover 10 from the housing 14 and attach the tab 24 to the patch 34.

The second embodiment of the invention, illustrated in FIGS. 5-8, utilizes a mounting bracket 40 attached to seat 12 by screws 42, to secure the housing 14 to the motorcycle. The second embodiment can be installed on the motorcycle seat 12 prior to final attachment of the seat to the frame 20. Attachment of the housing 14 under the seat 12, as illustrated in FIG. 8, allows for additional safety, whereby the housing is not exposed during use of the motorcycle, so as not to present a potential hazard to the rider.

Figure 5:
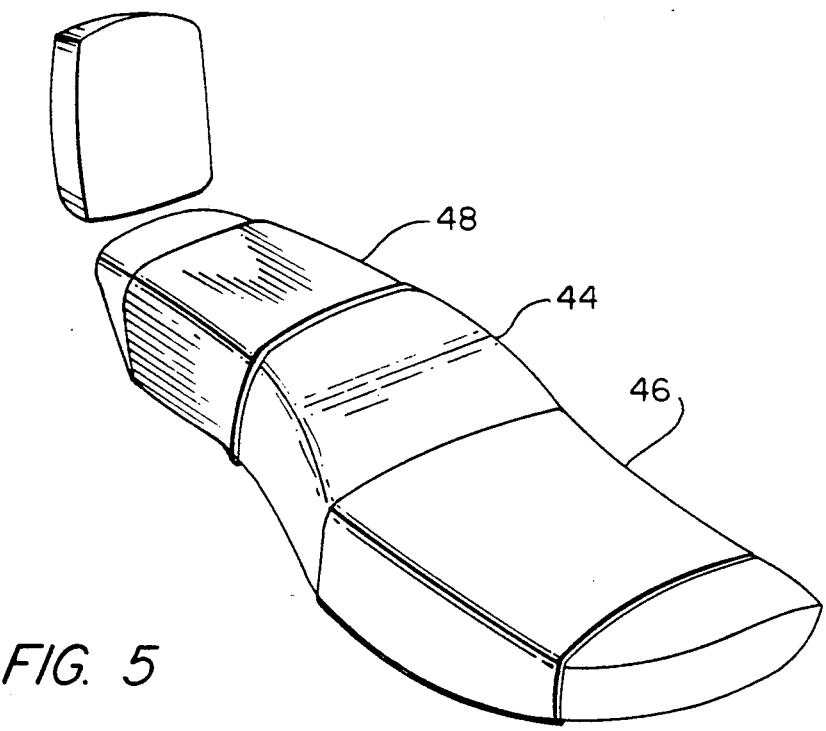
FIG. 5 is a perspective view of a second embodiment of the present invention protecting two separate portions of a motorcycle seat.

As illustrated in FIG. 5, two protective devices can be utilized upon a single motorcycle seat such as the two-tier seat 44. Each of the two devices provides a separate cover 46, 48 for protecting different portions of the seat 44. The covers can be constructed in accordance with second embodiment as illustrated or can be of the first embodiment or a combination of the two. Each device would have its own housing and securing means.

Because many varying and different embodiments may be made within the scope of the inventive concept herein taught, and because many modifications may be made in the embodiments herein ailed in accordance with the descriptive requirements of the law, it is to be understood that the details herein are to be interpreted as illustrative and not in a limiting sense, the invention being defined by the following claims.

I claim:

1. A device for protecting a surface portion of a motorcycle seat supporting a rider, comprising:

a housing, an elongated cover extending transversely across said motorcycle seat and having a first end secured within said housing, a tab member with engagement means thereon attached to a second end of said cover, and first and second lateral edges extending from said first end to said second end, said cover having a width shorter than a length of said motorcycle seat so that only a portion of the motorcycle seat is covered, first securing means for attaching said housing to said motorcycle adjacent a first side edge of said seat, second securing means for cooperating with said engagement means and attached to said motorcycle adjacent a second side edge of said motorcycle seat opposite said first side edge, biased winding means for retracting said cover into said housing in a first position and for biasing said cover against extension from said housing to maintain said cover taut against said motorcycle seat in a second deployed position, elastic means for providing a tensional bias to each of said lateral edges for urging said lateral edges into contact with the surface of said seat in said second position, and an elongated rigid member attached to said second end and extending from said first edge to said second edge.

2. A device for protecting a motorcycle seat extending longitudinally from a back to a front of a motorcycle, comprising:

a flexible cover having opposite ends extending transversely across a top surface of said motorcycle seat;

a housing for containing said cover;

first securing means for attaching said housing adjacent a first side of said motorcycle seat and second securing means attached to an opposite side of said motorcycle seat, a first end of said cover being fixed to said housing and a second end of said cover having means for engaging said second securing means, and said cover having a width that is equivalent to the length of said motorcycle seat that is engaged by a rider and/or passenger of said motorcycle so that only a longitudinal portion of the surface of the motorcycle seat between said sides is covered by said cover;

winding means within said housing and connected to said first end of said cover for tensioning said cover towards retraction and for retracting said cover into said housing, whereby said device has a first storage position wherein said cover is retracted in said housing and a second deployed position wherein said cover extends from said housing across said seat to said securing means and is held taut by said winding means to said portion of the motorcycle seat; and said cover has a front edge and a rear edge extending from said first side to said opposite side when in said deployed position, each of said edges provided with a biasing means for holding each said edge taut and in contact with the surface of said seat.

3. A device for protecting a motorcycle seat according to claim 2, wherein said first securing means has means for attaching said housing to said motorcycle in a position hidden from view and adjacent an underneath side of said motorcycle seat.

* * * * *